United States Patent [19]
Kirkland

[11] Patent Number: 5,427,333
[45] Date of Patent: Jun. 27, 1995

[54] VARIABLE SPEED DROGUE

[75] Inventor: William L. Kirkland, Kingman, Ariz.

[73] Assignee: West Coast Netting, Inc., Kingman, Ariz.

[21] Appl. No.: 280,879

[22] Filed: Jul. 26, 1994

Related U.S. Application Data

[63] Continuation-in-part of Ser. No. 204,901, Mar. 2, 1994, abandoned, which is a continuation of Ser. No. 135,009, Oct. 12, 1993, abandoned, which is a continuation of Ser. No. 964,378, Oct. 21, 1992, Pat. No. 5,255,877.

[51] Int. Cl.⁶ .............................................. B64D 37/00
[52] U.S. Cl. .......................... 244/135 A; 244/135 R
[58] Field of Search ............... 244/135 A, 135 R, 152, 244/113; 141/279–388

[56]                References Cited
U.S. PATENT DOCUMENTS

| | | | |
|---|---|---|---|
| 2,823,881 | 2/1958 | Patterson | 244/135 A |
| 2,946,543 | 7/1960 | Gordon et al. | 244/113 |
| 2,960,291 | 11/1960 | Patterson | 244/135 A |
| 2,998,949 | 9/1961 | Patterson | 244/135 A |
| 3,011,742 | 12/1961 | Gross | 244/113 |
| 3,067,972 | 12/1962 | Mosher | 244/135 A |
| 3,108,769 | 10/1963 | Hieber | 244/135 A |
| 4,927,099 | 5/1990 | Emerson et al. | 244/152 |

FOREIGN PATENT DOCUMENTS 541505 10/1955 Belgium.

Primary Examiner—Margaret A. Focarino
Assistant Examiner—Christopher Ellis
Attorney, Agent, or Firm—Fulwider, Patton, Lee & Utecht

[57]                ABSTRACT

The variable speed drogue for use with an inflight aerial refueling system includes a refueling coupling for receiving a refueling probe. A plurality of trailing edge support arms are pivotally mounted to the trailing edge portion of the refueling coupling, projecting rearwardly, and a plurality of leading edge support arms are pivotally connected to the refueling coupling forward and outward of the trailing edge support arms. A drogue canopy is connected between the trailing ends of the leading and trailing edge support arms, presenting a projected area, to provide drag. A plurality of cord linkages are secured at one end to the leading edge of the drogue canopy, and are connected at their other end to a rear cord ring mounted to the trailing edge portion of the refueling coupling member. A mechanism is provided for uniformly and symmetrically extending and retracting the cord linkages longitudinally with respect to the refueling coupling member to uniformly and symmetrically change the projected area of the drogue canopy.

26 Claims, 12 Drawing Sheets

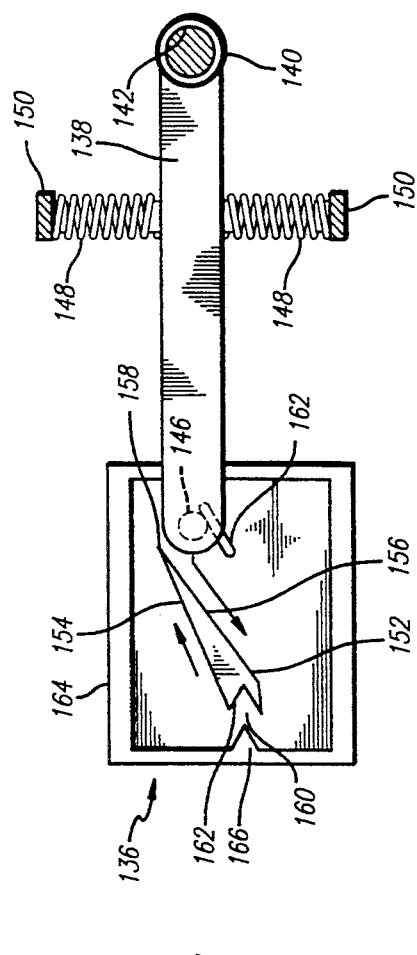
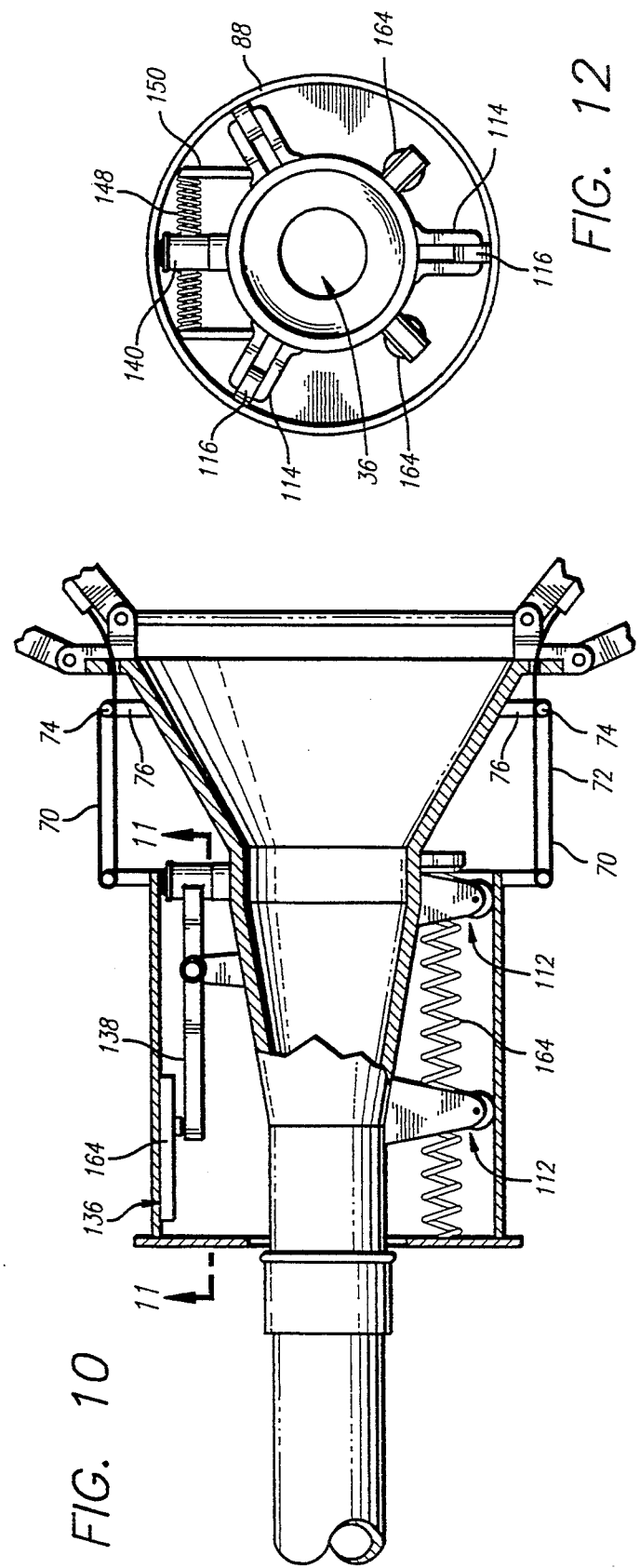

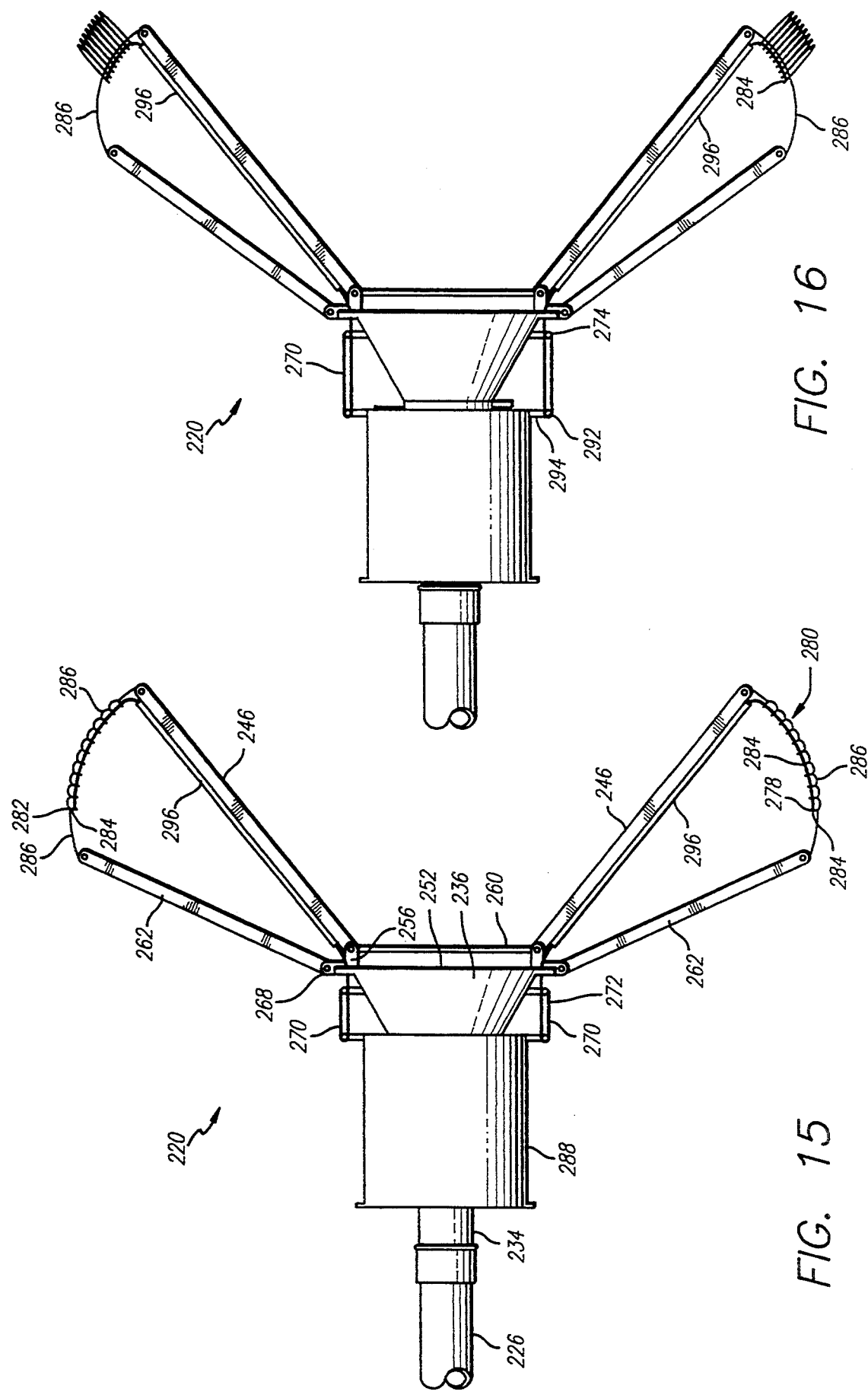

VARIABLE SPEED DROGUE

RELATED APPLICATIONS

This is a continuation-in-part of Ser. No. 08/204,901, filed Mar. 2, 1994, which was a continuation of Ser. No. 08/135,009 filed, Oct. 12, 1993, now abandoned, which was a continuation of Ser. No. 07/964,378, filed Oct. 21, 1992, U.S. Pat. No. 5,255,877.

BACKGROUND OF THE INVENTION

1. Field of the Invention

This invention relates generally to aerodynamic drogues for aerial inflight refueling, and more particularly concerns an improved drogue having adjustable support arms for a canopy to permit the configuration of the drogue to be modified in flight to be useful at different air speeds.

2. Description of Related Art

The development of drogues for inflight refueling of aircraft has been primarily directed by the need to stabilize a refueling hose trailing from a tanker aircraft in a generally horizontal attitude. The drogue provides drag for the refueling coupling, which must resist the forward movement of a probe from a refueling aircraft. Cone shaped drogues have proved to be suitable for low speed inflight refueling; however, it has been found that such drogues can generate excessive drag at higher speeds, creating loads beyond the hose reel operating capabilities.

The high amount of drag provided by a drogue for low speed refueling also can cause the trail angle of the refueling hose and coupling to become flattened. It is desirable that the refueling aircraft not follow directly in the wake of the tanker aircraft, because the configuration of a drogue which may be appropriate for low air speed refueling can be inappropriate for high speed refueling, even if the motion of the refueling coupling can be stabilized by aerodynamic designs.

It has therefore been a common practice to install either a low or high speed configuration drogue on the refueling coupling of a tanker aircraft on the ground, depending upon whether the aerial refueling is to take place at low or high speed, and to land to change the drogue to one of another speed configuration when an aircraft needs to be refueled at a different speed. Another approach has been to fabricate the ring shaped parachute canopy of the drogue of elastic material with openings which permit pressure modulation to provide for a constant amount of drag over varying speeds. However, such elastic openings have been found to be subject to deterioration, which can cause the amount of drag provided by the drogue to decrease over time, and can also cause an asymmetrical drag configuration to develop.

It has also been proposed to mount the ring shaped canopy to a spring assembly allowing for deflection of the canopy of the drogue to provide for a constant amount of drag, so that the drogue can be used at varying speeds. Such a spring mounting of the canopy at the trailing edge of the fuel coupling or support arms has also been found to be prone to damage from contact with a probe of a refueling aircraft, which can interfere with the drag configuration and stability of the drogue during the inflight refueling operation.

There is therefore a continuing need for a variable speed drogue which can be modified during flight or on the ground to have different drag configurations to allow the drogue to be used at high and low speeds, and which is not generally susceptible to deterioration or damage from a refueling probe. In order to safely control the amount of drag provided by the drogue, it would be desirable to be able to adjust the projected area of the canopy of the drogue in flight by a mechanism external to the fuel coupling for changing the angle of separation of support arms to which the canopy is attached. It would be also be desirable that the support arms be external to the fuel coupling, to be generally protected from potentially damaging contact with a refueling probe. Where the canopy is attached to a series of leading and trailing edge support arms, it would also be desirable to provide a mechanism for uniformly and symmetrically moving the pivot points of the leading edge support arms relative to the trailing edge support arms, to change the projected area of the canopy, and to consequently adjust amount of drag of the refueling drogue for operation at different speeds. It would further be desirable that the drag adjustment mechanism be operable remotely or manually, during flight or on the ground. The present invention fulfills these needs.

SUMMARY OF THE INVENTION

Briefly, and in general terms, the present invention provides for a variable speed drogue having a variable amount of drag provided by an adjustable area of projection of the drogue canopy, which can be set remotely or manually, during flight or on the ground, to provide the necessary amount of drag appropriate for different speeds of inflight refueling. A drag adjustment mechanism external to the refueling coupling is provided for uniformly changing the pivot points of leading edge support arms relative to trailing edge support arms, between which the canopy is attached. The drag adjustment mechanism can be operated during flight while the refueling coupling member is in a stowed position in a stowage tube, either mechanically, hydraulically, or electrically.

The invention provides for a variable speed drogue for use with an inflight aerial refueling system having a refueling coupling member for receiving a refueling probe. The variable speed drogue includes a plurality of trailing edge support arms pivotally mounted to the trailing edge portion of the refueling coupling member and projecting rearwardly from the refueling coupling member. A plurality of leading edge support arms also project rearwardly with respect to the refueling coupling member, pivotally mounted to the refueling coupling member radially outwardly and forward of the trailing edge support arms at a plurality of pivot mounting points.

A drogue canopy is connected between the trailing ends of the leading and trailing edge support arms, presenting projected area, to provide drag. A plurality of cord linkages are secured at one end to the inside of the drogue canopy at or near the outer, leading edge of the drogue canopy, and are slidably secured to the inside of the drogue canopy at a plurality of selected points in line with the trailing edge arms by cord loops, rings, tubes or the like. The cord linkages are connected at their other end to a rear cord ring mounted to the trailing edge portion of the refueling coupling member.

A mechanism is provided for uniformly and symmetrically extending and retracting the cord linkages longitudinally with respect to the refueling coupling member to uniformly and symmetrically change the projected area of the drogue canopy. In a preferred embodiment, the mechanism moving the cord ring includes a generally tubular sleeve mounted external to the refueling coupling member for movement longitudinally with respect to the refueling coupling member. A forward sleeve cord ring is provided on a trailing edge of the sleeve, and the cord linkages loop around the forward sleeve cord ring to extend rearwardly and radially inwardly of the rear cord ring to the drogue canopy. Thus, movement of the sleeve to pull or slacken the cord linkages changes the projected area of the drogue canopy, to vary the amount of drag provided by the drogue canopy. Latch means are connected to the sleeve and the refueling coupling member for setting the sleeve in any one of a plurality of positions in a forward or rearward longitudinal direction relative to the refueling coupling member. Means are provided for moving the sleeve in a forward or rearward direction longitudinally relative to the refueling coupling member to set the sleeve in any one of the plurality of positions, and preferably includes a means in the aerial refueling system for latching the sleeve in a selected position. The sleeve preferably has a high drag, low speed position and a low drag, high speed position, although other intermediate speed settings of the sleeve may also be provided.

These and other aspects and advantages of the invention will become apparent from the following detailed description, and the accompanying drawings, which illustrate by way of example the features of the invention.

BRIEF DESCRIPTION OF THE DRAWINGS

FIG. 10 is a sectional elevational view of the variable speed drogue of FIG. 1, illustrating the latch mechanism and an alternate actuator mechanism;

FIG. 11 is an enlarged top plan view of the latch mechanism, taken along line 11—11 of FIG. 10;

FIG. 12 is a cross-sectional view of the refueling coupling member and sleeve of the variable speed drogue as shown in FIG. 8;

FIG. 15 is a sectional elevational view of an alternate drogue canopy attachment and adjustment mechanism for the variable speed drogue of the invention in a high drag, low speed position; and FIG. 16 is a sectional elevational view of the alternate drogue canopy attachment and adjustment mechanism of FIG. 15 in a low drag, high speed position.

DETAILED DESCRIPTION OF THE PREFERRED EMBODIMENTS

It has been found that the configuration of inflight refueling drogues for low and high speed refueling, is important to avoid oscillation and instability at high speeds, and to provide the proper trail angle for the flight speed during refueling. Landing for changing of the appropriate low or high speed configuration drogues on the ground between refueling of aircraft inflight at different speeds can be tedious and time consuming. Conventional parachute canopies with elastic openings and spring assemblies to provide for a constant amount of drag over varying speeds are subject to deterioration and damage by contact with a probe of a refueling aircraft, interfering with the drag configuration and stability of the drogue during the inflight refueling operation.

Figure 1:
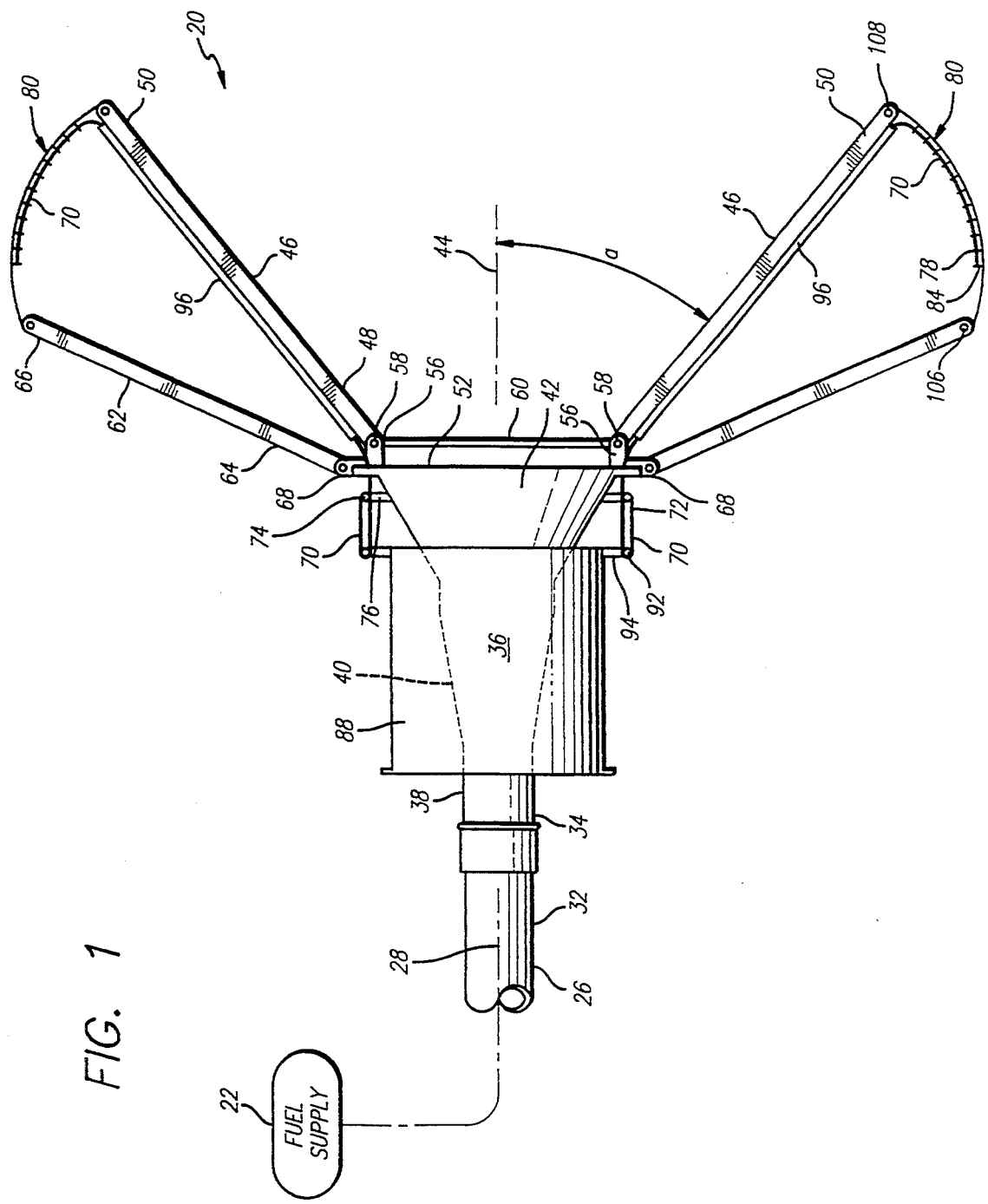
FIG. 1 is a sectional elevational view of a variable speed drogue for inflight refueling of aircraft in a high drag, low speed position, according to the invention.

With reference to the drawings, in which like reference numerals refer to like elements, and which are provided by way of example, the invention accordingly provides for a variable speed drogue with a mechanism for varying the drag exerted by the drogue external to the refueling coupling, that is not generally susceptible to deterioration or damage from a refueling probe, and that can be modified during flight for different speed configurations. The invention is accordingly embodied in a variable speed drogue 20 for use with an inflight aerial refueling system. With reference to FIG. 1, the inflight aerial refueling system typically includes a fuel supply 22, such as a fuel tank in a tanker aircraft, an aircraft drogue stowage tube 24 which can be mounted in a wing pod or fuselage of a tanker aircraft for stowing the drogue, and a fuel line 26 that can be extended and retracted during flight for refueling other aircraft, that is connected for fluid communication with the fuel supply. The fuel line has a longitudinal axis 28, a leading end 30 connected to the tanker aircraft fuel supply, and a trailing end 32 connected to the forward end 34 of a refueling coupling member 36. The refueling coupling member is generally hollow and conical in shape, with the forward mating end portion 34 being attached to the fuel line, a tubular intermediate section 38, a tapered intermediate throat section 40 flaring outward slightly to the rear of the tubular intermediate section for roller latch connection with a refueling probe (not shown) of an aircraft that is refueling, and a funnel shaped, tapered mouth portion 42 flaring outwardly at the rearward end of the refueling coupling member for receiving the refueling probe. The longitudinal axis of the fuel line is generally in line with the longitudinal axis 44 of the refueling coupling member where they are joined together.

Figure 2:
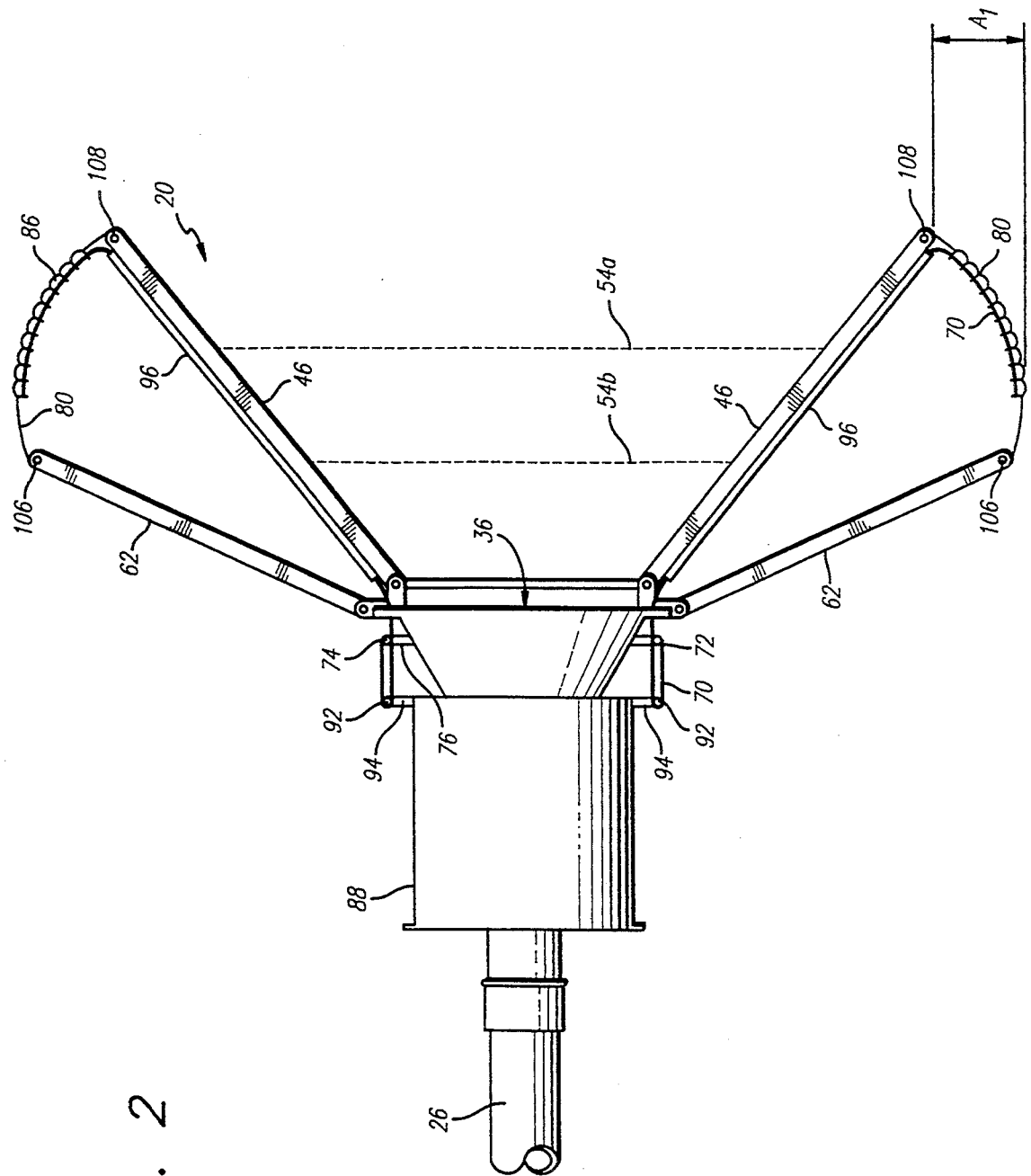
FIG. 2 is a sectional elevational view of the variable speed drogue of FIG. 1 in a high drag, low speed position depicting the projected area A of the drogue canopy.

As is illustrated in FIGS. 1-7, a plurality of trailing edge support arms 46, each having a leading end 48 and a trailing end 50, are pivotally mounted to the trailing edge portion 52 of the refueling coupling member, and are adapted to extend outwardly at an angle a with respect to the longitudinal axis of the refueling coupling member, as will be further explained below, limited in their outward extension by extension limiting means such as cables 54a and 54b, shown in FIG. 2, connecting adjacent trailing edge support arms to each other at intermediate points along the length the trailing edge support arms.

In one preferred implementation of the invention, 36 trailing edge support arms are arrayed around the trailing edge of the refueling coupling member. The trailing edge portion of the refueling coupling member preferably includes a plurality of inner flanges 56 symmetrically arrayed around the trailing edge portion of the refueling coupling member, each of the flanges having an aperture 58 in which a first, inner fixed attachment ring 60 is mounted. The leading ends of the trailing edge support arms include an aperture (not shown) through which the first fixed attachment ring also extends, for pivotal mounting of the trailing edge support arms to the refueling coupling member.

A plurality of leading edge support arms 62, each having a leading end 64 with a proximal aperture (not shown) therethrough, and a distal, trailing end 66, are pivotally mounted to the refueling coupling member by connection to outer flanges 68 pivotally connecting the proximal ends of the leading edge support arms to the refueling coupling member. In the preferred embodiment, where 36 trailing edge support arms are provided, 18 moveable leading edge support arms are provided, each of the moveable support arms being interspersed between two of the trailing edge support arms. The pivot points at the proximal ends of the leading edge support arms are typically spaced apart from the proximal ends of the trailing edge support arms by about three inches.

Figure 14:
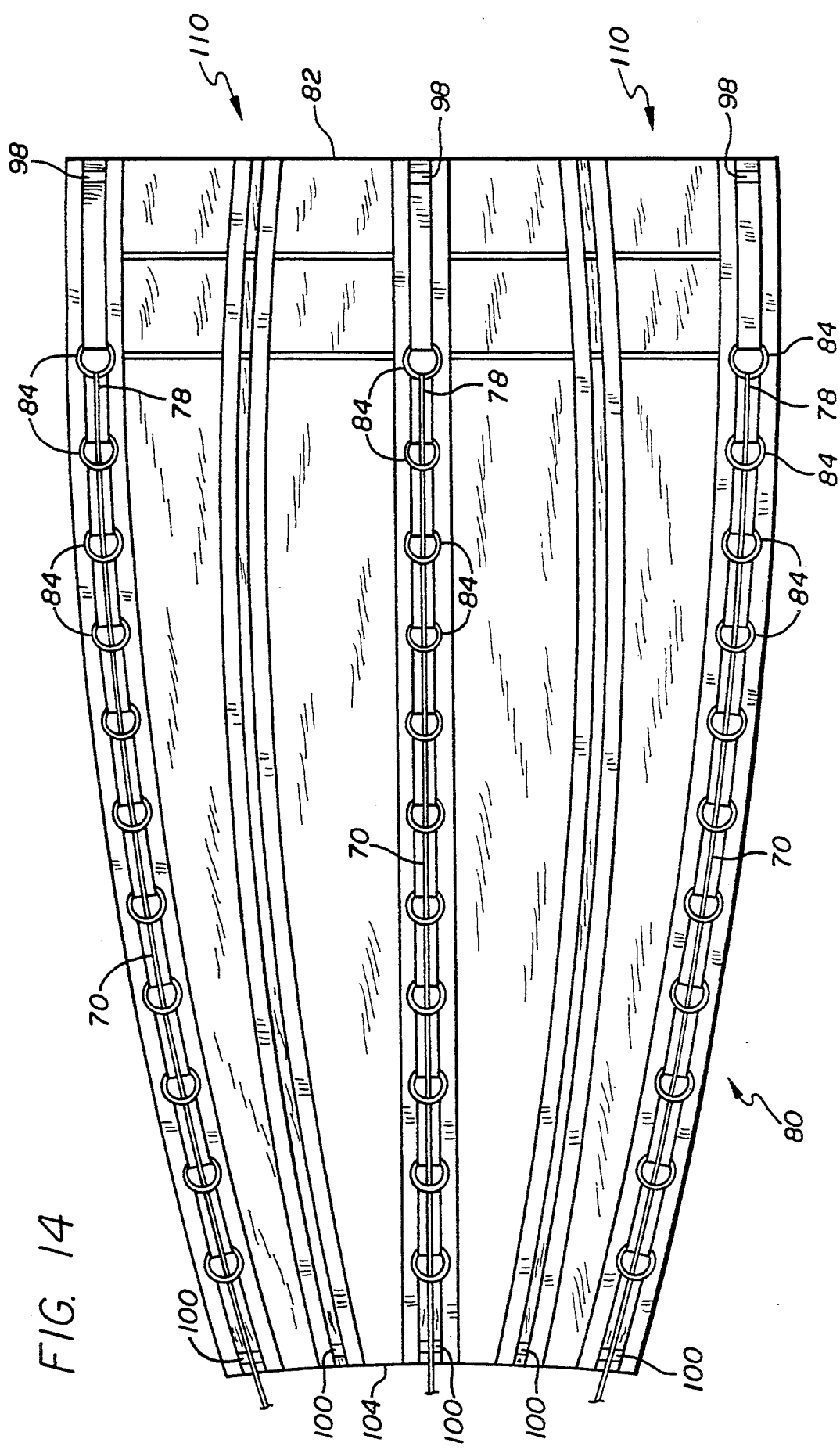
FIG. 14 is a plan view of a section of the drogue canopy of the variable speed drogue of the invention.

A plurality of cord linkages or lanyards 70 provide a linkage between the drag adjusting mechanism and the drogue canopy. In one currently preferred embodiment, there are 18 cords, one for every other trailing edge support arm. The cord linkages are preferably arranged in alignment with the leading edge support arms, separated by alternating trailing edge support arms. As can best be seen in FIGS. 1, 2, 4 and 10, the cord linkages each have a forward end 72 secured to a rear cord ring 74 that can be mounted by a flange 76 adjacent to the trailing edge of the refueling coupling member. Referring to FIG. 14, showing a portion of the drogue canopy 80, the plurality of cord linkages are preferably secured at their opposite end 78, such as by a knot or the like, to the inside of the drogue canopy 80 adjacent to the leading edge 82 of the drogue canopy by fastening means 84. Alternatively, the cord linkages can continue on and be secured to the leading edge 82 of the drogue canopy by fastening means at that point, or the cord linkages could in certain instances be secured to intermediate fastening means that are more removed from the leading edge 82 of the drogue canopy. The plurality of cord linkages are also preferably slidably secured to the inside of the drogue canopy at a plurality of selected points in line with the trailing edge arms by the fastening means 84. In a currently preferred embodiment, the fastening means comprises a row of eleven nylon loops attached, such as by stitching to the drogue canopy, each row of loops being in line with one of the leading edge support arms, and in line with the corresponding trailing edge arm. Alternatively, the fastening means can comprise other numbers of fasteners, and similar common fasteners, such as cord loops of other types of material, stainless steel rings attached by such loops to the drogue canopy, tubes or the like. As is best illustrated in FIGS. 2-7, when the drogue canopy is deployed, the drogue canopy has a scalloped leading edge, and forms a series of scalloped, radial stabilization pockets 86. The scalloping extends rearward from the leading edge of the drogue canopy to the forward fastening means, and continues rearwardly through the folds and radial stabilization pockets that are produced, to the trailing edge of the drogue canopy. The stabilization pockets are most pronounced and most effective in the high speed position, in which the folds of the drogue canopy are gathered together, so that the pockets inflate, becoming cells of dynamic pressure. The net effect is that the dynamic behavior of the drogue canopy is broken down into many smaller components, substantially improving the stability of the drogue, particularly at high speed. This stabilizing effect is believed to occur due to the limitation of changes in dynamic pressure to multiple small areas rather than to a single large area, as occurs with presently existing drogues.

Figure 8:
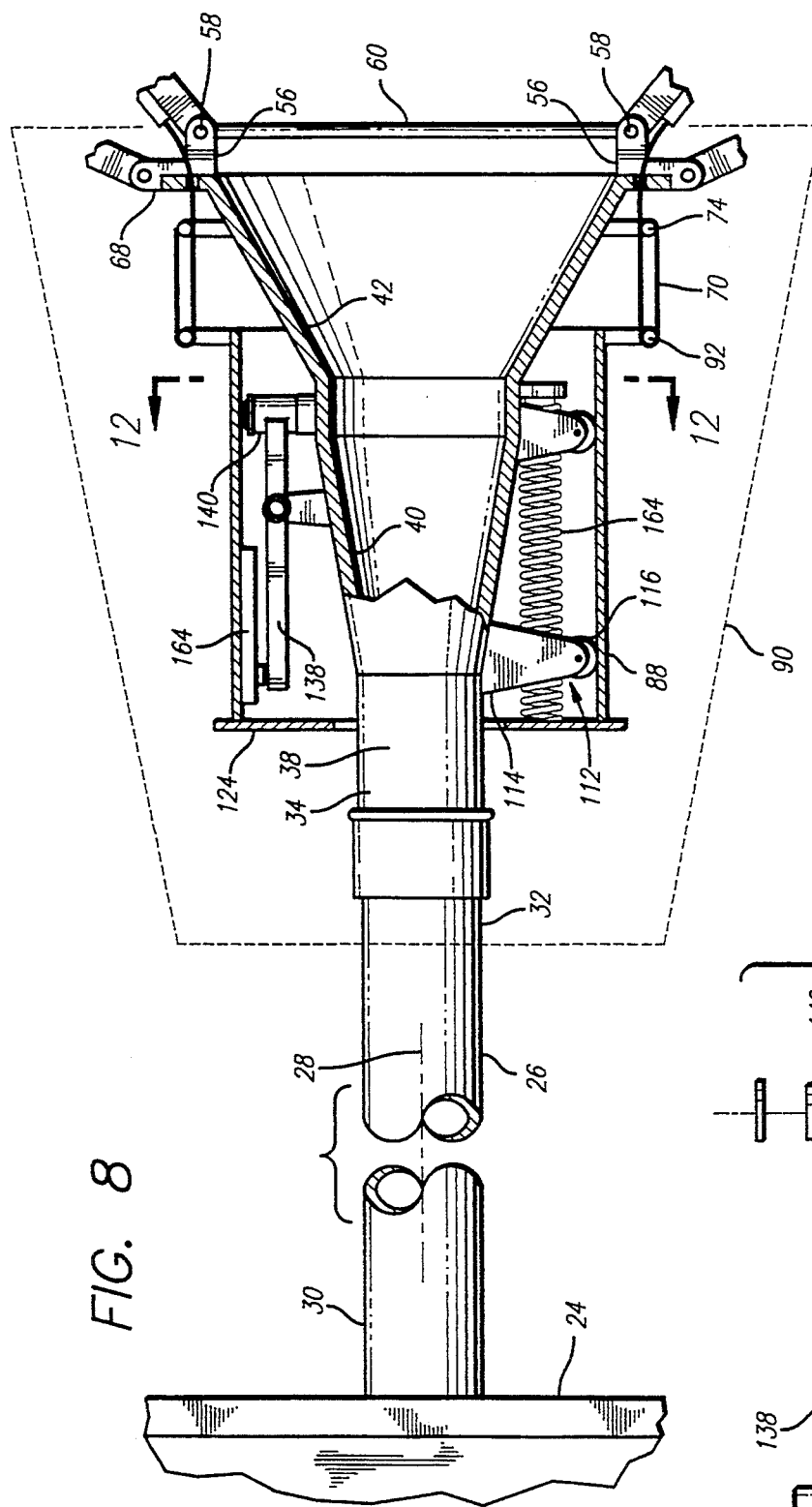
FIG. 8 is an enlarged, partial sectional elevational view of the variable speed drogue of FIG. 1.
Figure 9:
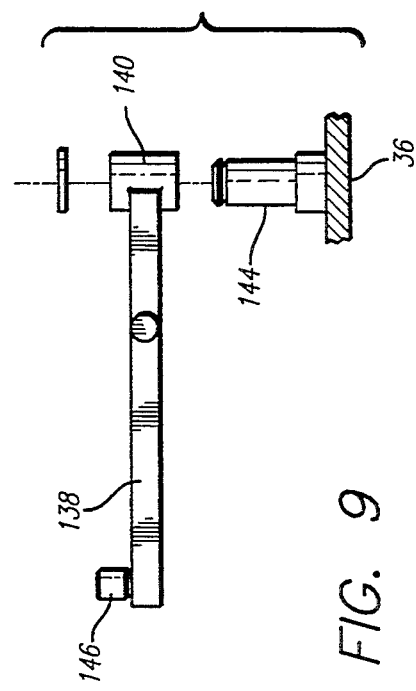
FIG. 9 is an enlarged view of the latch bar and mounting of a portion of the latch mechanism.
Figure 13:
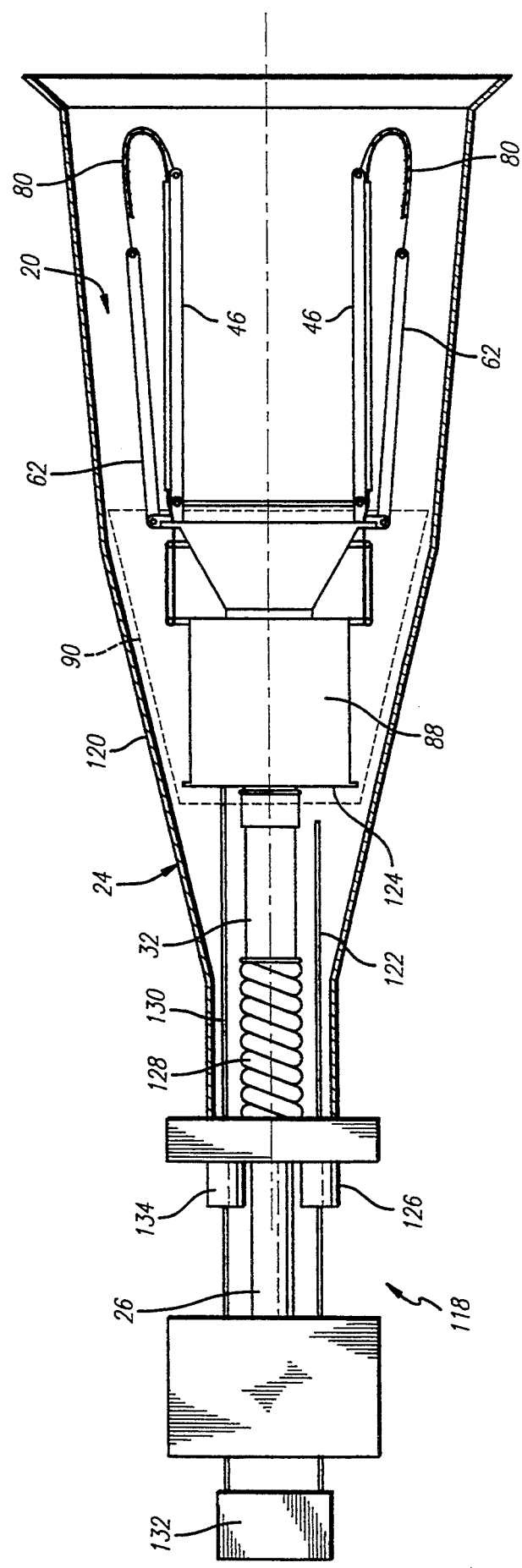
FIG. 13 is a cross-sectional view of the variable speed drogue of FIG. 1 stowed within a stowage tube.

A moveable, generally tubular sleeve 88, covered by a conical, protective shroud 90 shown in FIGS. 8 and 13, is mounted to the forward end of the refueling coupling member, and is movable longitudinally with respect to the refueling coupling member. A forward sleeve cord ring 92 is also mounted to a trailing edge flange 94 of the sleeve. In a preferred embodiment, the cord linkages extend from the rear cord ring 74 on the trailing edge of the refueling coupling member forward to loop around the sleeve cord ring 92, then rearwardly and radially inwardly of the rear cord ring 74, and through a plurality of protective tubes 96 mounted to the trailing edge support arms, such as by welding, extending outwardly of and approximately the length of the trailing edge arms through the plurality of fastening means. The other end of the cord linkages 70 are finally secured to an outermost, most forward fastening means 84 on the drogue canopy adjacent the leading edge of the drogue canopy, such as by knots or the like, to provide a 2 to 1 mechanical advantage, so that movement of the sleeve one inch pulls or slackens the cord linkages two inches, changing the projected area of the drogue canopy, to vary the amount of drag provided by the drogue canopy. Alternatively, this 2 to 1 mechanical advantage may not be necessary, and it would also possible to secure the cord linkages directly between the sleeve and the drogue canopy, without looping from the rear cord ring on the refueling coupling around the forward cord ring on the sleeve.

Figure 3:
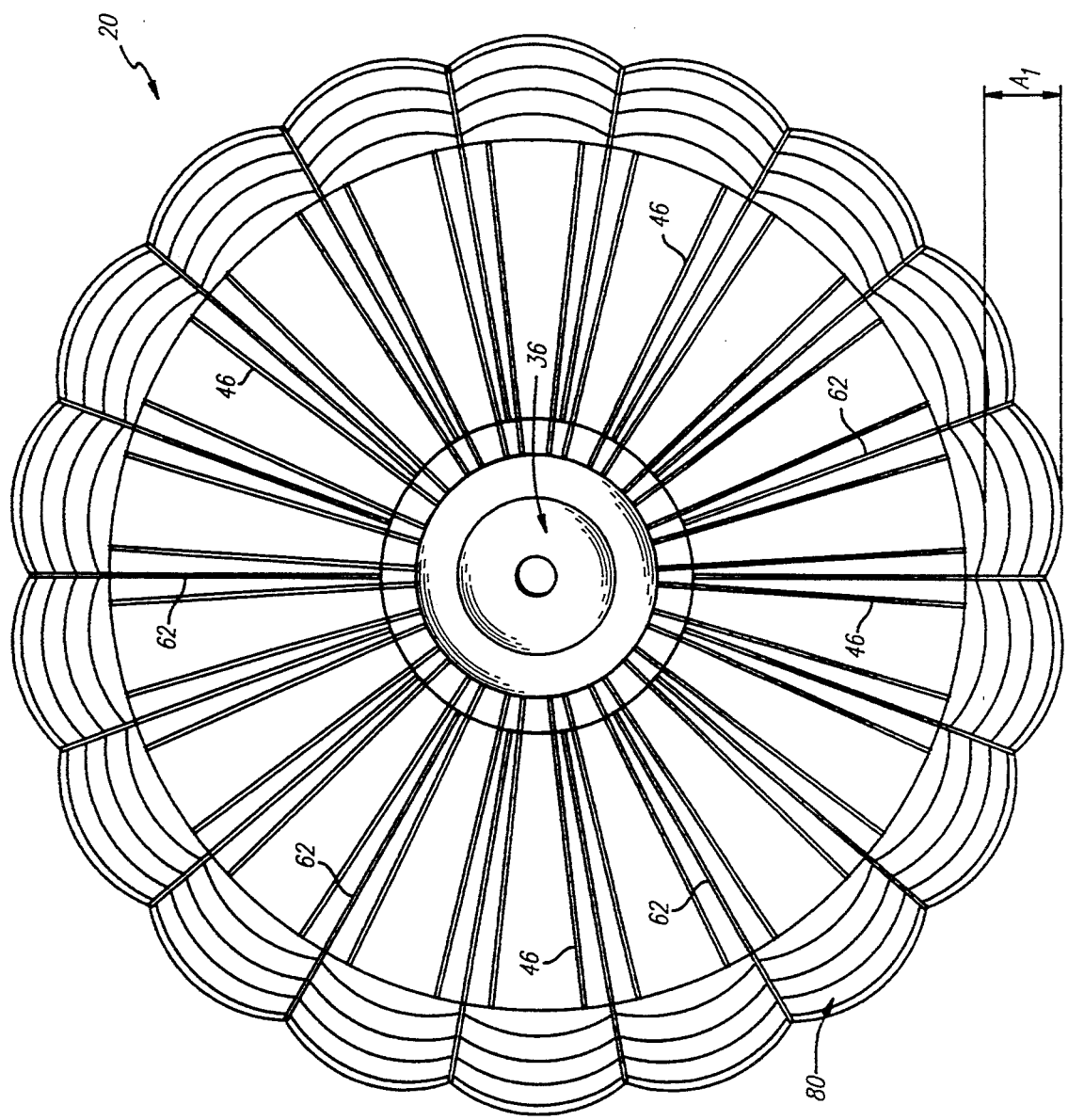
FIG. 3 is a rear view of the variable speed drogue in the high drag, low speed position shown in FIG. 2.
Figure 4:
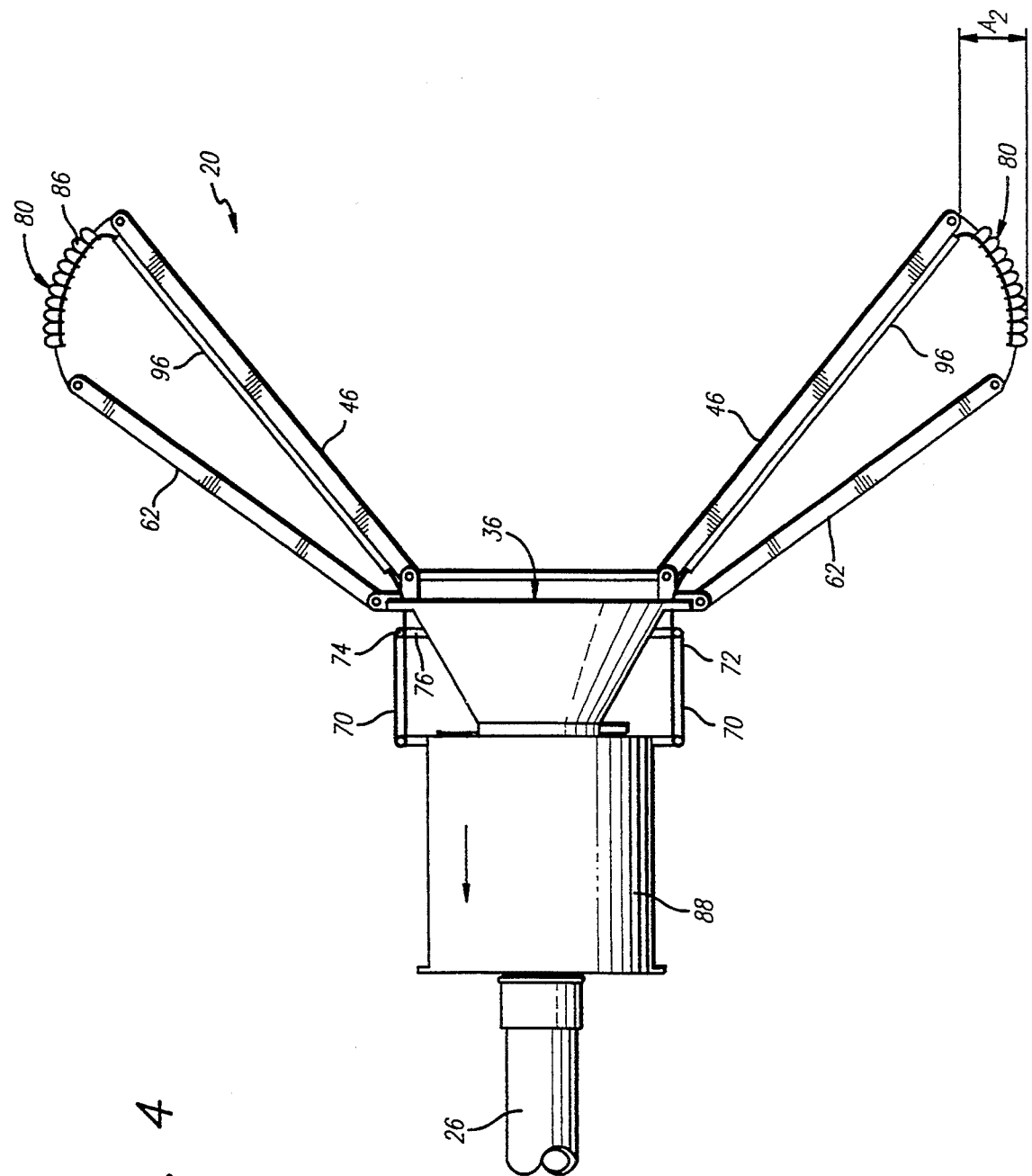
FIG. 4 is a sectional elevational view of the variable speed drogue of FIG. 1 in a low drag, high speed position depicting the projected area $A_2$ of the drogue canopy.
Figure 5:
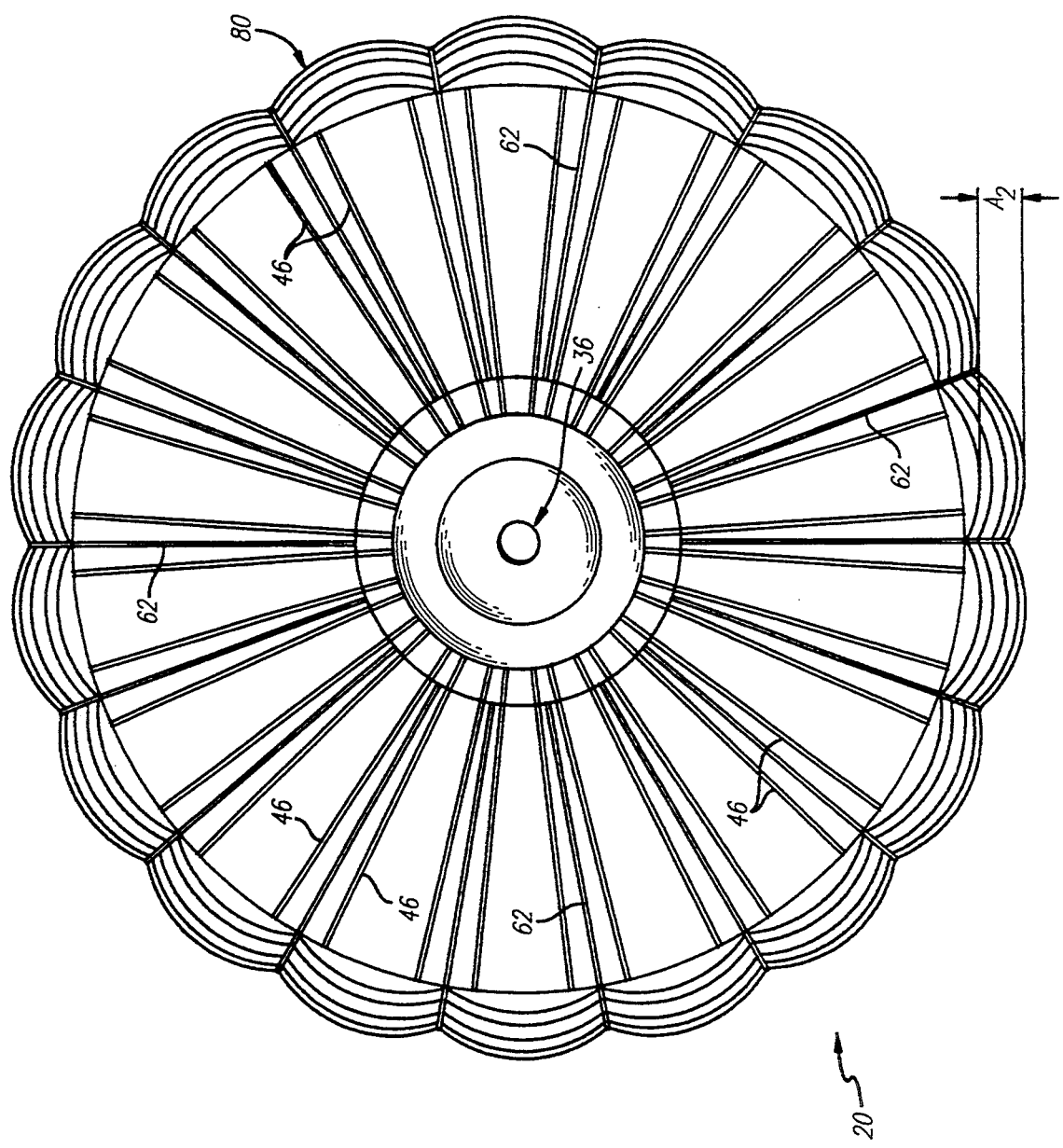
FIG. 5 is a rear view of the variable speed drogue in the low drag, high speed position shown in FIG. 4.

Referring to FIG. 14, the drogue canopy member 80 is preferably a parachute type of canopy attached to the trailing ends of the leading edge support arms and the trailing end of the trailing edge support arms, such as by nylon cords (not shown), although a cable, hooks or loops, or the like may also be suitable. For example, cords attaching the drogue canopy member to the leading edge support arms typically passes through channels (not shown) and apertures 98 in the leading edge 82 of the drogue canopy member, and passes through corresponding distal apertures 106 in the trailing ends of the leading edge support arms. Similarly, cords attaching the drogue canopy member to the trailing edge support arms typically passes through channels (not shown) and apertures 100 in the trailing edge 104 of the drogue canopy member, and passes through corresponding distal apertures 108 in the trailing ends of the trailing edge support arms. As is best seen in FIGS. 3, 5 and 14, the drogue canopy member preferably comprises a ring shaped parachute canopy of the drogue formed of a plurality of trapezoidal sections 110 having a slightly larger leading edge 82 than the trailing edge. The drogue parachute canopy may for example be made from fabric, netting, webbing, or the like, and may be made of nylon, or similar materials that are well known in the art. By virtue of movement of the sleeve to pull or slacken the cord linkages, the drogue presents a variable projected area depending upon the positioning of the sleeve, to provide for an appropriate amount of drag force for varying refueling flight speeds.

Figure 6:
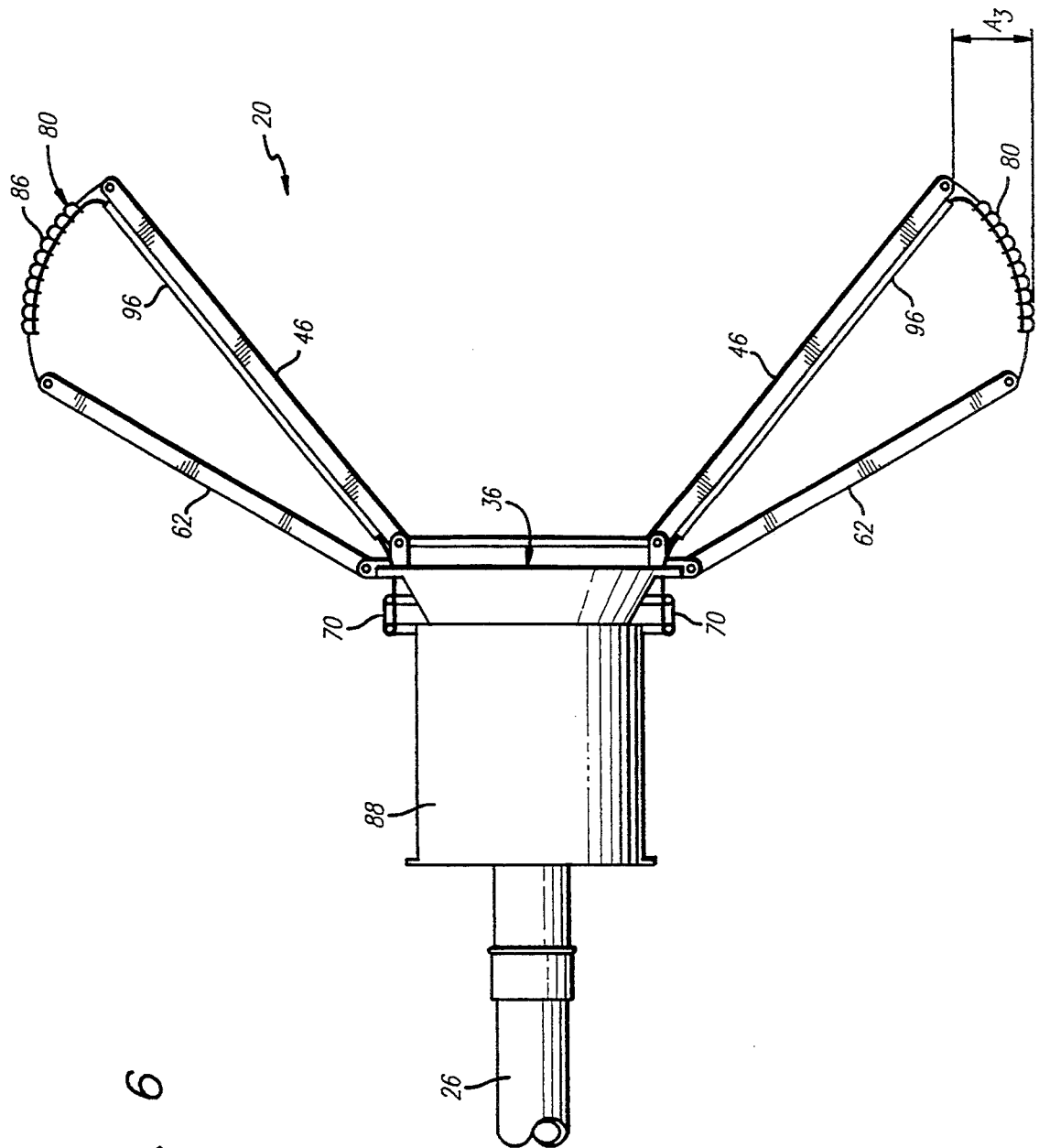
FIG. 6 is a sectional elevational view of the variable speed drogue of FIG. 1 in an intermediate drag, intermediate speed position depicting the projected area $A_3$ of the drogue canopy.
Figure 7:
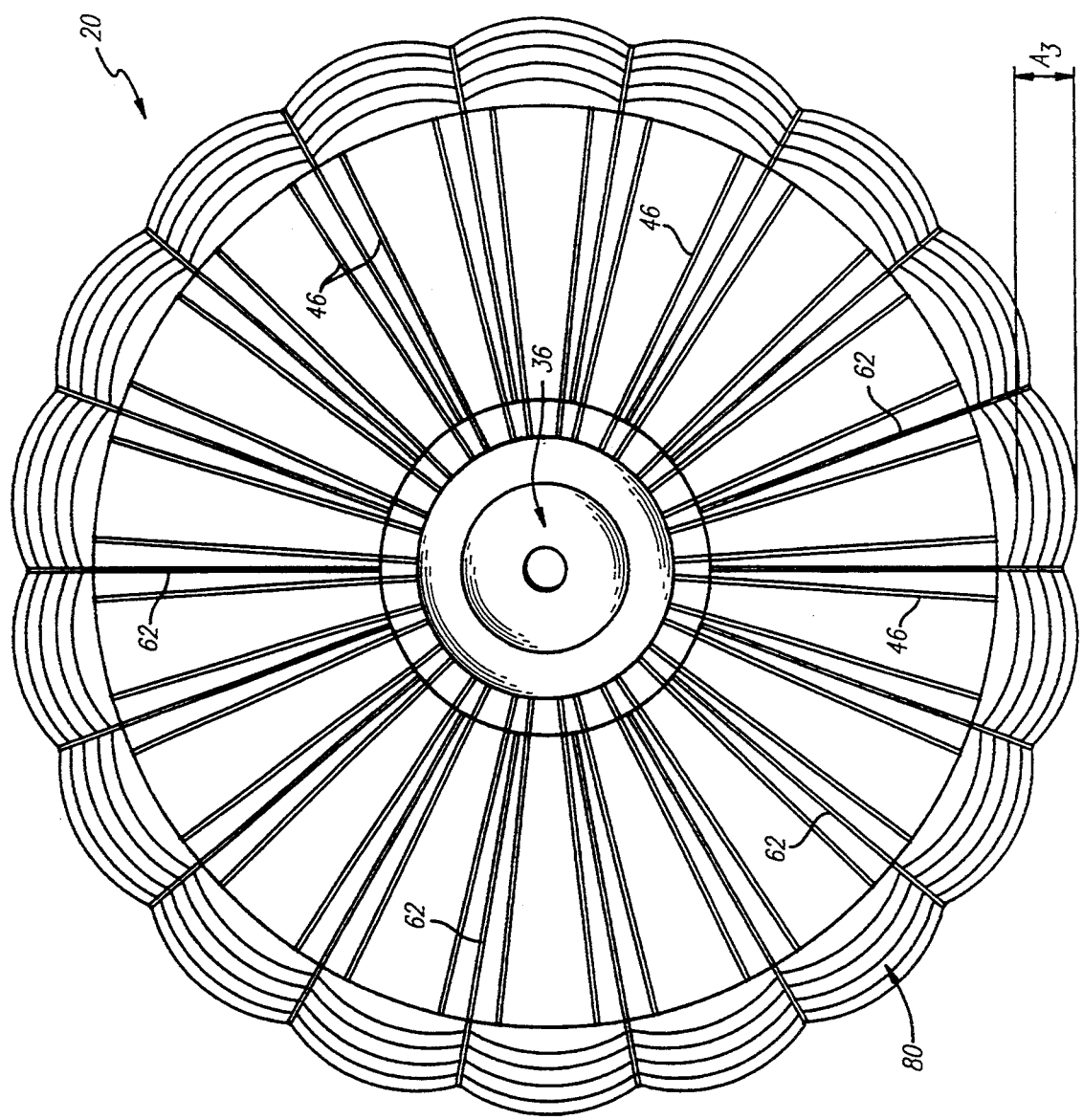
FIG. 7 is a rear view of the variable speed drogue in the intermediate drag, intermediate speed position shown in FIG. 6.

Typically, a drag force of approximately 1000 lbs. or less is desired at all operating speeds ranging from a low speed of 60 knots to a high speed of 300 knots or higher. In order to provide the proper drag force, the canopy member preferably has a projected area extending between the trailing end of the leading edge support arm and the trailing end of the trailing edge support arm that can be adjusted. By adjustment of the position of the sleeve forward to pull on and take up the cords to gather the folds of the stabilization pockets of the drogue canopy member, or rearward to slacken and provide a greater length of the cords to open the drogue canopy member more fully, the projected area of the drogue canopy member between the trailing ends of the two sets of support members can be decreased or increased, respectively, to provide the desired amount of drag for refueling at various speeds. Typically, the adjustments of the variable speed drogue between higher and lower speed positions is performed while the system is fully retracted and stowed, although the adjustments can also be performed while the system is deployed. The actual amount of drag provided by the drogue will is determined by the amount of load required. In one preferred embodiment, illustrated in FIGS. 1–5, the sleeve can be adjusted between two positions, for example, one in a rearward position providing a larger projected area ($A_1$) for low speed refueling, and one in a forward position providing a smaller projected area ($A_2$) for high speed refueling. The sleeve can also be adjusted to intermediate positions, as is illustrated in FIGS. 6 and 7, to present an intermediate projected area ($A_3$), to provide an intermediate amount of drag for refueling at in intermediate speed.

With reference to FIG. 8, the sleeve is preferably mounted external to the refueling coupling member for movement relative thereto by a plurality of support rollers 112 each having a base portion 114 mounted externally on said refueling coupling member, and a bearing roller portion 116 adjacent to the inner tubular surface of the sleeve, to allow the sleeve to move smoothly and uniformly relative to the longitudinal axis of the refueling coupling member. In a preferred embodiment, the sleeve has at least a forward, high speed position, and a rearward, low speed position, although additional intermediate positions can also be provided, as described above.

In one preferred aspect of the invention, the variable speed drogue additionally comprises drag adjustment actuator means 118 for moving the sleeve 88 longitudinally in a forward or rearward direction with respect to the refueling coupling member. A preferred drag adjustment actuator means is shown in FIG. 13, mounted at the forward end 120 of stowage tube 24. The drag adjustment actuator means preferably includes an elongated drive rod 122 that can be extended toward a contact surface such as contact plate 124 attached to the forward end of the sleeve to push the sleeve into a desired position, and retracted. The drive rod is currently preferably driven longitudinally in a forward and rearward direction by electric drive means such as an electric motor 126, although the drive rod may be driven by other means such as a hydraulic system, provided at the forward end of the aircraft drogue stowage tube, mechanically, or manually, for adjusting the drogue position when the drogue is retracted and stowed in the stowage tube. The drag adjustment actuator means can thus push against the sleeve actuator contact plate 124, for moving the sleeve in a rearward direction and releasing the sleeve, to latch the sleeve in one of the desired drag configuration positions. It is also possible to operate the latch system of the invention by retraction of the fuel line by a typical fuel line retraction and extension system (not shown), so as to cause the sleeve contact plate to be pressed against a fixed limit stop bar (not shown) similar to the drive rod 122, preferably located at the forward end of the aircraft drogue stowage tube. A coil compression ejection spring 128 is disposed at the trailing end 32 of the fuel line, and is compressed against the limit stop by when the fuel line is fully retracted, to allow a quick expulsion of the variable speed drogue when released. The drag adjustment actuator means also preferably includes means for sensing the position of the sleeve with respect to the refueling coupling member, and in a currently preferred embodiment includes an elongated sense rod 130 that can be extended toward the contact plate 124 of the sleeve to make electrical contact with the contact plate, to complete an electrical sensing circuit providing a position signal to the control unit 132 for control of the drive rod for positioning of the leading edge support arms. The sense rod is currently preferably driven longitudinally in a forward and rearward direction by electric drive means such as an electric motor 134, although the sense rod may be driven by other means such as a hydraulic system, provided at the forward end of the aircraft drogue stowage tube.

The latch mechanism 136 as illustrated in FIGS. 8–11 is preferably connected between the sleeve and the refueling coupling for adjustably fixing the sleeve in a plurality of positions in a forward or rearward direction with respect to the longitudinal axis of the refueling coupling member. In the preferred embodiment, the latch mechanism includes a latch bar 138, pivotally connected to the refueling coupling member by a pivot bushing 140, having an aperture 142 therein, at the trailing end of the latch bar, to a post 144 received in the aperture 142. The post is preferably mounted externally on the refueling coupling member, as can best be seen in FIG. 9. A detent roller or bearing 146 is mounted at the other end of the latch bar, and latch springs 148 mounted to inner flanges 150 on the sleeve are connected to an intermediate portion of the latch bar to bias the latch bar in a centered position, while allowing the latch bar to pivot as the detent roller encounters and interacts with a latch guide member 152 secured to the sleeve. The latch guide member is preferably formed generally in the shape of a triangle positioned at an oblique angle with respect to the orientation of the latch bar, with a leading side 154 shown away from the latch bar, a trailing side 156 shown nearest to the latch bar, a narrow angle 158 shown adjacent to the latch bar, and at least one notch 160, in the leg 162 of the triangular guide member opposite the narrow angle. The latch guide member is mounted in a housing 164 secured to the sleeve. The housing also preferably contains at least one guide post 166 adjacent to the notch 160, and additional guide features such as guide block 162 on the leading side of the housing, to assist in guiding the roller of the latch bar into and out of the notch as the latch is operated. Biasing means, such as coil compression springs 164, which are preferably three symmetrically arranged compression springs, are connected between the sleeve contact plate and the refueling coupling member to bias the sleeve and guide member housing in a forward position, and to therefore bias the latch bar in a rearward position relative to the guide member, for placement of the variable speed drogue in a high speed configuration.

From the position shown in FIG. 11, operation of the drive rod to move the sleeve and guide member housing rearwardly moves the latch roller along the trailing side of the guide member 152 into the guide notch, to latch the sleeve in a rearward, low speed position. Operation of the drive rod again moves the sleeve and guide member housing rearwardly to unlatch the latch roller out of the guide notch. When the drive rod is released, the compression springs bring the sleeve and guide member housing forward and the latch roller back along the leading side 154 of the guide member, to finally rest against the guide block feature 162 with the sleeve in a forward, high speed position again.

With reference to FIGS. 15 and 16, in an alternate preferred embodiment of the variable speed drogue, the drogue canopy member is slidably connected to the leading edge support arms by a plurality of support arm cords. The variable speed drogue 220 is otherwise substantially similar to the embodiment depicted in FIGS. 1-14. Thus, in this embodiment, the fuel line 226 is connected to the forward end mating portion 234 of the refueling coupling member 236, and the plurality of trailing edge support arms 246 are pivotally mounted to the trailing edge portion 252 of the refueling coupling member by the fixed attachment ring 260 secured to the refueling coupling member by inner flanges 256. The plurality of leading edge support arms 262 are pivotally mounted to the refueling coupling member by connection to outer flanges 268.

A plurality of cord linkages 270 extend between the drag adjusting mechanism and the drogue canopy, and have a forward end 272 connected to a rear cord ring 274 mounted at or near the trailing edge of the refueling coupling member. The plurality of cord linkages are secured at their opposite end 278 to the inside of the drogue canopy 280 at or adjacent to the leading edge 282 of the drogue canopy by fastening means 284, and are slidably secured to the inside of the drogue canopy at a plurality of selected points in line with the trailing edge arms by fastening means 284, that are typically stainless steel rings attached in rows by nylon loops to the drogue canopy, each row of rings being in line with one of the leading edge support arms, and in line with the corresponding trailing edge arm.

As is illustrated in FIGS. 15 and 16, when the drogue canopy is deployed, the drogue canopy forms a series of radial stabilization pockets 286. The generally tubular sleeve 288 mounted to the forward end of the refueling coupling member is movable longitudinally with respect to the refueling coupling member, and a forward sleeve cord ring 292 is mounted to a trailing edge flange 294 of the sleeve. The cord linkages extend from the rear cord ring 274 on the trailing edge of the refueling coupling member forward to loop around the sleeve cord ring 292, then rearwardly and radially inwardly of the rear cord ring 274, and through a plurality of protective tubes 296 connected to the trailing edge support arms, such as by welding, extending outwardly of and approximately the length of the trailing edge arms through the plurality of fastening means. The protective tubes can also be formed as part of the trailing edge arms, such as by extrusion. The other end of the cord linkages 270 are secured to the forward fastening means 284 on the drogue canopy adjacent the leading edge of the drogue canopy, such as by knots or the like, providing a 2 to 1 mechanical advantage.

The drogue canopy member 280 is preferably a parachute type of canopy attached to the trailing ends of the trailing edge support arms, such as by cords or cables, and the like, extending through apertures in the trailing ends of trailing edge support arms. However, the drogue canopy member is slidably connected to the trailing ends of the leading edge support arms by support arm cords 286, such as nylon cords, extending between the trailing ends of the leading edge support arms and the trailing ends of the trailing edge support arms, although cables or the like may also be suitable. The support arm cords 286 typically pass through the rows of fastening means 284. Adjustment of the position of the sleeve rearwardly to slacken the cord linkages releases the drogue canopy member slide to be fully opened by the force of the air on the drogue canopy member to provide a larger projected area for low speed refueling. Adjustment of the position of the sleeve to a forward position pulls on the cord linkages to reign in the drogue canopy member, reducing projected area of the drogue canopy member. As before, the sleeve can also be moved to intermediate positions, to provide an intermediate amount of drag for refueling at intermediate speeds.

It should be evident from the foregoing that the variable speed drogue of the invention can be modified during flight to have different speed configurations, by a mechanism external to the refueling coupling member which are thus generally protected from potentially damaging contact with a refueling probe form a refueling aircraft. It is significant that the variable speed refueling drogue is thus not generally susceptible to deterioration or damage from a refueling probe. It is also significant that the projected area of the canopy of the drogue can be adjusted by increasing or decreasing the projection of the leading edge support arms uniformly and symmetrically, to consequently change the drag of the refueling drogue for operation at different speeds. The drag adjustment mechanism can be operated by a mechanical, hydraulic, or electric drive, to allow the drag configuration to be adjusted remotely during flight, or can be operated by hand for ready reconfiguration on the ground or manual operation in flight.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A variable speed drogue for use with an inflight aerial refueling system, said system including a fuel supply; a fuel line having leading and trailing ends and being in fluid communication with said fuel supply; and refueling coupling means for receiving a refueling probe, said refueling coupling means having a longitudinal axis, a forward end and a rearward end, and a trailing edge portion at said rearward end, said refueling coupling means forward end being mounted to said trailing end of said fuel line; said variable speed drogue comprising:

a plurality of trailing edge support arms pivotally mounted to said trailing edge portion of said refueling coupling means;

a plurality of leading edge support arms pivotally mounted to said trailing edge portion of said refueling coupling means radially outwardly and forward of the trailing edge support arms, said plurality of leading edge support arms each having a leading end and a trailing end;

a drogue canopy connected between said trailing end of said leading edge support arms and said trailing end of said trailing edge support arms, said drogue canopy having a leading edge and a trailing edge, and a projected area extending between said leading and trailing edges of said drogue canopy;

a plurality of cord linkages each having a first end connected to said trailing edge of said refueling coupling means and a second end connected adjacent to said leading edge of said drogue canopy, said plurality of cord linkages being movable between a first retracted position and a second extended position, said projected area of said drogue canopy being variable between a minimum projected area in said first retracted position and a maximum projected area in said second extended position;

slide means connected to said plurality of cord linkages for uniformly and symmetrically moving said plurality of cord linkages between said first and second positions, said slide means being mounted external to said refueling coupling means for longitudinal relative movement therewith between forward and rearward positions, said forward and rearward positions corresponding to said cord linkage first retracted and second extended positions, respectively, whereby to adjust said projected area of said drogue canopy means such that said drogue canopy produces a variable drag when said slide means is moved between said forward and rearward positions for refueling at different speeds.

2. The variable speed drogue of claim 1, wherein said slide means further comprises a first cord ring mounted to a trailing edge of said slide means, said refueling coupling means further comprises a second cord ring mounted to said trailing edge of said refueling coupling means rearwardly of said first cord ring, and said plurality of cord linkages extend forward from said second cord ring, loop around said first cord ring, and extend rearwardly and radially inwardly of the second cord ring to said trailing edge of said drogue canopy.

3. The variable speed drogue of claim 1, wherein said trailing edge support arms each have a leading end, and a trailing end projecting rearwardly from said refueling coupling means and pivoting outwardly at an angle limited by extension limiting means connecting said trailing edge support arms together at a point intermediate said leading and trailing ends of said trailing edge support arms.

4. The variable speed drogue of claim 1, further including means for moving said slide means in a forward or rearward direction to move said slide means between said forward and rearward positions.

5. The variable speed drogue of claim 1, further comprising actuator means for moving said slide means relative to said refueling coupling means about the longitudinal axis of said refueling coupling means.

6. The variable speed drogue of claim 1, wherein said slide means comprises a generally tubular sleeve member.

7. The variable speed drogue of claim 1, further including latch means connected to said slide means and said refueling coupling means for adjustably fixing said slide means in said forward and rearward positions.

8. The variable speed drogue of claim 1, further including a plurality of protective tubes mounted to said trailing edge arms, and wherein each of said cord linkages extends rearwardly and radially inwardly of the rear cord ring and through one of said plurality of protective tubes.

9. The variable speed drogue of claim 5, further including means for biasing said slide means in a forward direction.

10. The variable speed drogue of claim 1, wherein said leading edge of said drogue canopy is secured to said trailing edge of said leading edge support arm, said trailing edge of said drogue canopy is secured to said trailing edge of said trailing edge support arm, said drogue canopy includes a plurality of fastening means arrayed in a plurality of rows extending radially on a forward side of said drogue canopy between the leading and trailing edges of the drogue canopy, and said cord linkages extend through said rows of fastening means and are secured to radially outward ones of said fastening means in said rows adjacent to the leading edge of said drogue canopy.

11. The variable speed drogue of claim 1, wherein said trailing ends of said leading edge and trailing edge support arms are connected by a plurality of support arm cords, said drogue canopy includes a plurality of fastening means arrayed in a plurality of rows extending radially on a forward side of said drogue canopy between the leading and trailing edges of the drogue canopy, said plurality of arm cords extending through said plurality of fastening means, whereby said drogue canopy is slidably connected to said trailing end of said leading edge support arm by said arm cords.

12. The variable speed drogue of claim 10, wherein said drogue canopy forms a plurality of stabilization pockets between said fastening means.

13. The variable speed drogue of claim 11, wherein said drogue canopy forms a plurality of stabilization pockets between said fastening means.

14. A variable speed drogue for use with an inflight aerial refueling system, said system including a fuel supply; a fuel line having leading and trailing ends and being in fluid communication with said fuel supply; and refueling coupling means for receiving a refueling probe, said refueling coupling means having a longitudinal axis, a forward end and a rearward end, and a trailing edge portion at said rearward end, said refueling coupling means forward end being mounted to said trailing end of said fuel line; said variable speed drogue comprising:

a plurality of trailing edge support arms pivotally mounted to said trailing edge portion of said refueling coupling means;

a plurality of leading edge support arms pivotally mounted to said trailing edge portion of said refueling coupling means radially outwardly and forward of the trailing edge support arms, said plurality of leading edge support arms each having a leading end and a trailing end;

a drogue canopy connected between said trailing end of said leading edge support arms and said trailing end of said trailing edge support arms, said drogue canopy having a leading edge and a trailing edge, and a projected area extending between said leading and trailing edges of said drogue canopy;

a plurality of cord linkages each having a first end connected to said trailing edge of said refueling coupling means and a second end connected adjacent to said leading edge of said drogue canopy, said plurality of cord linkages being movable among a plurality of positions to vary the projected area of said drogue canopy;

slide means connected to said plurality of cord linkages for uniformly and symmetrically moving said plurality of cord linkages among said plurality of positions, said slide means being mounted external to said refueling coupling means for longitudinal relative movement therewith between a plurality of longitudinal positions, said plurality of longitudinal positions corresponding to said cord linkage plurality of positions, respectively, whereby to adjust said projected area of said drogue canopy means such that said drogue canopy produces a variable drag when said slide means is moved among said plurality of positions for refueling at different speeds.

15. The variable speed drogue of claim 14, wherein said slide means further comprises a first cord ring mounted to a trailing edge of said slide means, said refueling coupling means further comprises a second cord ring mounted to said trailing edge of said refueling coupling means rearwardly of said first cord ring, and said plurality of cord linkages extend forward from said second cord ring, loop around said first cord ring, and extend rearwardly and radially inwardly of the second cord ring to said trailing edge of said drogue canopy.

16. The variable speed drogue of claim 14, wherein said trailing edge support arms each have a leading end, and a trailing end projecting rearwardly from said refueling coupling means and pivoting outwardly at an angle limited by extension limiting means connecting said trailing edge support arms together at a point intermediate said leading and trailing ends of said trailing edge support arms.

17. The variable speed drogue of claim 14, further including means for moving said slide means in a forward or rearward direction to move said slide means among said plurality of longitudinal positions.

18. The variable speed drogue of claim 14, further comprising actuator means for moving said slide means relative to said refueling coupling means about the longitudinal axis of said refueling coupling means.

19. The variable speed drogue of claim 14, wherein said slide means comprises a generally tubular sleeve member.

20. The variable speed drogue of claim 14, further including latch means connected to said slide means and said refueling coupling means for adjustably fixing said slide means in said plurality of longitudinal positions.

21. The variable speed drogue of claim 14, further including a plurality of protective tubes mounted to said trailing edge arms, and wherein each of cord linkages extends rearwardly and radially inwardly of the rear cord ring and through one of said plurality of protective tubes.

22. The variable speed drogue of claim 18, further including means for biasing said slide means and said pivot linkage means in a forward direction.

23. The variable speed drogue of claim 14, wherein said leading edge of said drogue canopy is secured to said trailing edge of said leading edge support arm, said trailing edge of said drogue canopy is secured to said trailing edge of said trailing edge support arm, said drogue canopy includes a plurality of fastening means arrayed in a plurality of rows extending radially on a forward side of said drogue canopy between the leading and trailing edges of the drogue canopy, and said cord linkages extend through said rows of fastening means and are secured to radially outward ones of said fastening means in said rows adjacent to the leading edge of said drogue canopy.

24. The variable speed drogue of claim 14, wherein said trailing ends of said leading edge and trailing edge support arms are connected by a plurality of support arm cords, said drogue canopy includes a plurality of fastening means arrayed in a plurality of rows extending radially on a forward side of said drogue canopy between the leading and trailing edges of the drogue canopy, said plurality of arm cords extending through said plurality of fastening means, whereby said drogue canopy is slidably connected to said trailing end of said leading edge support arm by said arm cords.

25. The variable speed drogue of claim 23, wherein said drogue canopy forms a plurality of stabilization pockets between said fastening means.

26. The variable speed drogue of claim 24, wherein said drogue canopy forms a plurality of stabilization pockets between said fastening means.

* * * * *

UNITED STATES PATENT AND TRADEMARK OFFICE
CERTIFICATE OF CORRECTION

PATENT NO. : 5,427,333
DATED : June 27, 1995
INVENTOR(S) : William L. Kirkland

It is certified that error appears in the above-indentified patent and that said Letters Patent is hereby corrected as shown below:

Column 3, line 40, change "A" to --$A_1$--.

Column 5, line 1, change "a" to --$\underline{a}$--

Signed and Sealed this

Twentieth Day of February, 1996

BRUCE LEHMAN

*Attest:*

*Attesting Officer*           *Commissioner of Patents and Trademarks*